(No Model.)
G. H. WILLIS.
LATHE DOG.
No. 515,391. Patented Feb. 27, 1894.
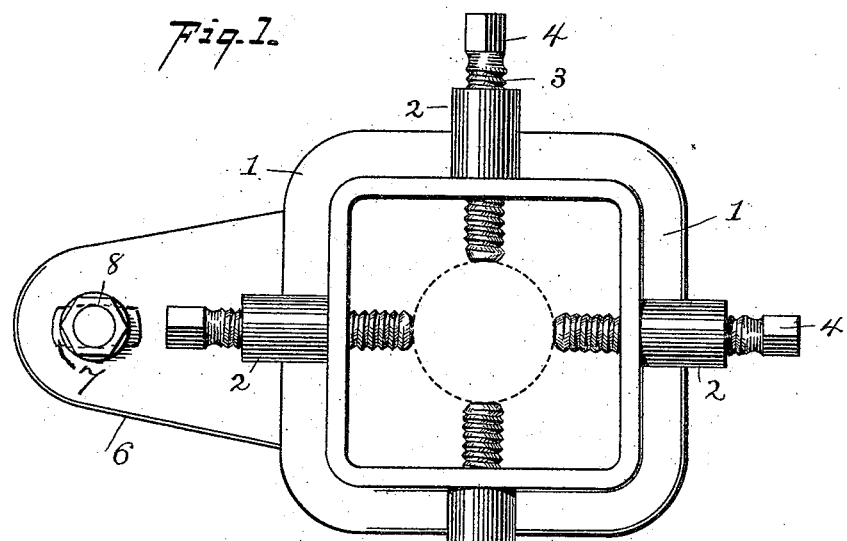
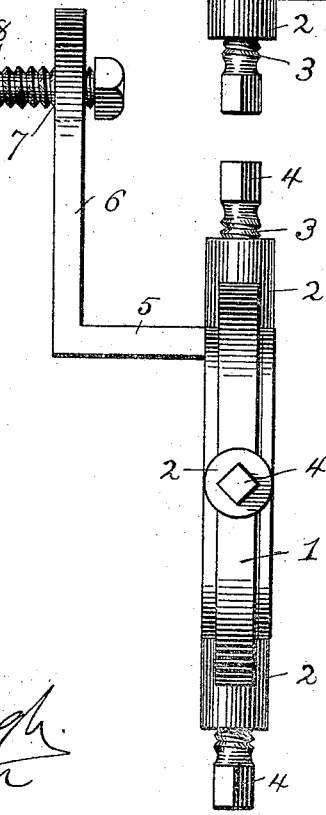
Attest:
Elliott P. Hough
A. R. Brown
Inventor:
George H. Willis
By Chas. J. Gooch
Attorney

UNITED STATES PATENT OFFICE.

GEORGE H. WILLIS, OF KINGMAN, KANSAS.

LATHE-DOG.

SPECIFICATION forming part of Letters Patent No. 515,391, dated February 27, 1894.

Application filed July 11, 1893. Serial No. 480,161. (No model.)

*To all whom it may concern:*

Be it known that I, GEORGE H. WILLIS, a citizen of the United States, residing at Kingman, in the county of Kingman and State of Kansas, have invented certain new and useful Improvements in Lathe-Dogs; and I do hereby declare the following to be a full, clear, and exact description of the invention, such as will enable others skilled in the art to which it appertains to make and use the same.

This invention relates to certain improvements, as hereinafter set forth, in lathe-dogs.

In the accompanying drawings—Figure 1 represents a front elevation of one of my improved lathe-dogs, and Fig. 2 a side elevation thereof.

My improved lathe-dog is of a construction whereby it will serve all the purposes of a chuck and be capable of ready adjustment to securely and firmly hold articles of either regular or irregular shapes; it is adapted for ready and secure attachment to or removal from the face-plate of a lathe and is of such simple construction as to adapt it to be readily and cheaply constructed.

1 represents the frame which may be of any desired outline as square, square, with rounded corners, or of circular or other form.

2 represents interiorly-threaded bosses extending transversely through and outwardly from the respective sides of the frame 1.

3 represents the centering-bolts which are screw-threaded, as shown, and have revoluble bearing, on the respective threads, in and through the outwardly and transversely-extending bosses. The heads 4 of these centering-bolts are flattened, as shown, to adapt them to be readily grasped and turned by the hand of the operator.

5 represents an L-shaped dog-supporting offset or hanger, the lower member of said hanger extending at a right-angle from the upper edge of the frame 1 and having an upwardly-extending portion 6 which is transversely slotted at 7 to receive a bolt 8 by which said offset or hanger 5, 6, may be removably attached to the face-plate of the lathe, said right-angled offset or hanger permitting of the close and firm connection of the dog to the lathe as will be readily apparent.

By extending the bosses 2 out beyond the frame, as shown, an extended support and bearing are afforded the centering-screws which will thereby be afforded a firmer seat, be more firm and steady in their reciprocal movements, and will hold the articles clamped by them more steadily and securely than would be the case did not said bosses so extend; moreover the strain on the frame 1 is, by reason of such extended form of boss, materially lessened.

The frame and bosses may either be made integrally of wrought iron, or cast integrally with case-hardened screw-threads or they may be made of drop forgings with long and heavy bosses.

By bolting the dog to the face-plate of the lathe through the medium of the right-angled offset, 5, 6, the dog and the work being operated upon will be rigidly and securely held in position at all times and under all circumstances thereby avoiding the difficulty sometimes experienced, especially when turning work with a loose dog, of maintaining the steadiness of the parts in use; this difficulty is especially noticeable in screw-cutting or reversing lathes.

My dog while answering all, or nearly all, the purposes of a chuck is more convenient in adjustment on centered work, is much less expensive in construction, can be more expeditiously produced, operated and applied or removed than is the case with ordinary chucks. It is equally well adapted for holding articles of varying size and weight as, by reason of the construction of the bosses, the maximum of bearing support is afforded the centering bolts which are thereby always steadily and firmly supported in position and prevented from oscillation or slipping thereby insuring their firmly gripping the work.

What I claim, and desire to secure by Letters Patent, is—

A lathe-dog consisting of a frame having at its upper edge a hanger consisting of an L-shaped offset the lower arm of said hanger extending horizontally at a right-angle from the frame and its upper arm extending vertically therefrom and having at its upper end a transverse slot, a bolt and nut adapted to connect said vertical arm and the face-plate of the lathe, a plurality of interiorly-threaded bosses extending outwardly from the upper, lower and side edges, respectively, of said frame, and threaded centering bolts having adjustable bearing within said bosses and extending to the vertical and horizontal portions, respectively, of the center of said frame, substantially as and for the purpose set forth.

In testimony whereof I affix my signature in presence of two witnesses.

GEORGE H. WILLIS.

Witnesses:
   JNO. W. AITON,
   FRANK ROBERSON.